July 15, 1930. A. M. FRAUENHEIM 1,770,609
PIPE JOINT
Filed May 16, 1927

INVENTOR.
Aloysius M. Frauenheim
BY Ralph Oenath and
Paul Purchard.
ATTORNEYS.

Patented July 15, 1930

1,770,609

UNITED STATES PATENT OFFICE

ALOYSIUS M. FRAUENHEIM, OF PITTSBURGH, PENNSYLVANIA

PIPE JOINT

Application filed May 16, 1927. Serial No. 191,622.

This invention relates to pipe joints and more in particular to flexible and rotary pipe joints using yielding packing materials as sealing agents.

The primary object of this invention is to provide means whereby the packing material will at all time be subject to a yielding pressure to insure a leak-proof pipe joint. Another object is to provide means whereby the pressure on the packing may be adjusted to suit the fluid and the hydrostatic pressure at which the latter is operated. A further object is the provision of a flexible or rotary pipe joint of this character which is compact, simple in construction, efficient and which can be manufactured at relatively low cost. Additional features and advantages of this invention will appear from the following description considered in connection with the accompanying drawing forming a part of this application and in which:

Figure 1:
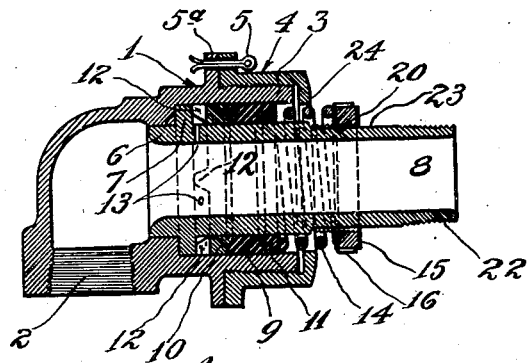
Fig. 1 is a longitudinal section through a rotary joint of the angle type.
Figure 2:
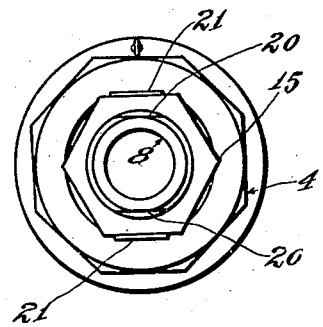
Fig. 2 is an end view of Fig. 1.
Figure 3:
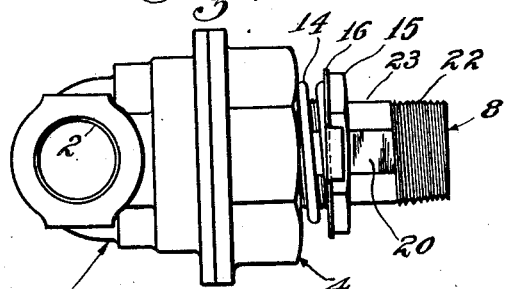
Fig. 3 is a bottom view of Fig. 1.
Figure 6:
Fig. 6 is a side elevaton of a coil-spring used in my invention.
Figures 7, 8:
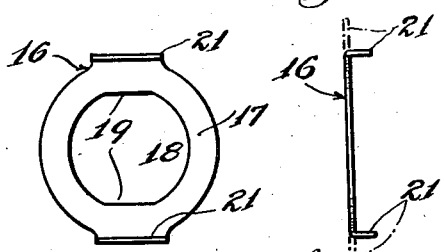
Fig. 7 is a front elevation of a lock washer also used in my invention.
Fig. 8 is a side view of Fig. 7.

The rotary joint illustrated in Figs. 1 to 3 comprises the flanged angle body 1 having a threaded aperture 2 for the reception of a pipe connection (not shown) and an outwardly threaded shell 3 upon which is screwed the polygonal and flanged bonnet 4, which is preferably held in position by means of a cotter-pin 5 engaging registering holes 5ª drilled in flanges of the body and bonnet. A portion of the interior of the body is bored out smoothly to two diameters to fit the extension 6 and the collar 7 provided on the sleeve-member 8. In the annular space formed between the sleeve and body I insert the gasket 9 which is preferably trapeziform in cross-section and which is wedged between the gasket-ring 10 and the follower-ring 11 the opposed annular faces of which are bevelled to suit the sides of the gasket. The gasket ring has contact-lugs 12 which bear against the collar 7, and apertures 13 are drilled through the sleeve member to enable the fluid carried in a line to exert pressure on the gasket ring. A coil-spring 14 is placed on the sleeve to bear against the outer side of the follower. The pressure exerted by said spring may be regulated by means of a threaded nut 15 which engages suitable threads cut outwardly on the sleeve and a special lock-washer 16 of ductile metal is used to lock said nut in the selected position. As shown in Figs. 7 and 8, this lock-washer consists of a body-portion 17 in which is cut a central aperture 18 of suitable size to fit about the sleeve and provided with one or more flat portions 19 which engage similar flats 20 cut on the sleeve member for the purpose of preventing the rotation of the washer about said sleeve. Lugs 21 are also provided on the washer to be bent over the flat sides of the nut 15 to prevent same from unscrewing. At the outer end of the sleeve is cut the pipe-thread 22, by which the joint is connected to the pipe line, and the intermediate space 23 between said thread and the nut 15 is used as a wrench-hold, the flats 20 affording a good gripping surface to hold the sleeve while the nut is being screwed against the spring. As will be understood, the pressure exerted by the spring against the follower tends to compress the packing and force it radially against the large bore in the body, and the sleeve member, thus preventing any leaks. Moreover, on account of the lock-washer, the nut will always rotate with the sleeve and maintain its adjustment.

The rotary sleeve 8 with the packing elements mounted thereon are kept within the body portion by the bonnet 4, the cap 24 of which is bored at the center to a smaller diameter than the outside diameter of the follower-ring, thus acting as a stop for the latter. If desired, the shell 3 may be lengthened to allow for a longitudinal movement, so-called traverse, of the sleeve-member therein, as suggested in Fig. 1 by the clearance space between the outer face of the follower and the inner face of the cap 24.

Actual and diversified use of my invention has shown that, in the majority of cases, the pressure exerted by the fluid will force the gasket ring, gasket and follower-ring outwardly until the latter bears against the cap 24 of the bonnet 4, and that the gasket is sufficiently compressed to produce a tight joint. However, should this pressure not suffice, additional pressure on the gasket may be created by compressing the spring 14, by means of the nut 15. Experience has also shown that pipe-joints of this character, especially when used on steam lines, are liable to leak when the steam is turned off on account of unequal contraction of the various parts of the joint, which condition allows the water of condensation to drip out of the joint. This defect is practically overcome in my invention because of the pressure exerted constantly by the coil spring on the compressible gasket.

Figure 4:
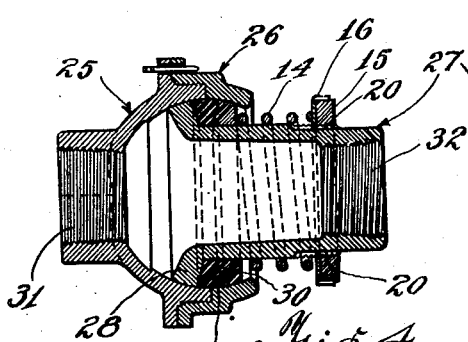
Fig. 4 is a longitudinal section through a flexible pipe joint of the straight type.
Figure 5:
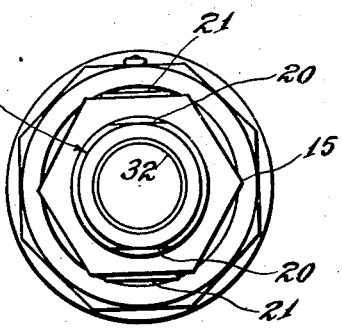
Fig. 5 is an end elevation of Fig. 4.

In Figs. 4 and 5 I have shown the application of my gasket compressing arrangement in connection with a universally flexible spherical pipe-joint. This flexible joint consists mainly of the flanged socket-cup 25, the screwed on socket-nut 26 and the sleeve-member 27 having a collar 28 the periphery of which is turned spherically to fit snugly within the correspondingly bored socket-cup and nut. Upon this sleeve is mounted the gasket 29 against the side of which the follower-ring 30 is forced by the coil-spring 14 whose tension is adjusted, as in the above mentioned rotary joint, by the threaded nut 15, locked by the lock-washer 16. Flat surfaces 20 are also provided on the sleeve-member to prevent the relative motion between the latter and the lock-washer. This flexible pipe joint is of the straight type and is connected to a pipe line by means of the threaded apertures 31 and 32.

As will be understood, as suggested herein, there may be slight changes made in the construction and arrangement of the details of my invention without departing from the field and scope of the same, and I intend to include all such variations, as fall within the scope of the appended claims, in this application in which the preferred form only of my invention has been disclosed.

I claim:

1. In a pipe joint comprising a body having a cylindrical portion bored to two diameters, a sleeve-member movable within said body and fitting partly within the smaller bore thereof; a collar positioned on the sleeve-member and engaging the larger bore of the body; a gasket-ring and a follower-ring slidably mounted on the sleeve-member; a gasket positioned intermediate the gasket-ring and the follower-ring; means to exert pressure on the follower-ring; spacer means positioned between the collar and the gasket-ring, and means to introduce fluid pressure in the space intermediate said collar and gasket-ring.

2. In a pipe joint comprising a body having a cylindrical portion bored to two diameters, a sleeve-member rotatably and longitudinally movable within said body and fitting partly within the smaller bore thereof; a collar positioned on the sleeve-member and engaging the larger bore of the body; a gasket-ring and a follower-ring slidably mounted on the sleeve-member and engaging the larger bore of the body; a gasket positioned intermediate the gasket-ring and the follower-ring; means to exert physical pressure on the follower-ring; spacer means positioned between the collar and the gasket-ring, and means to exert fluid pressure on the gasket-ring.

3. In a pipe joint comprising a body having a cylindrical portion bored to two diameters, a sleeve-member rotatably and longitudinally movable within said body and fitting partly within the smaller bore thereof; a collar positioned on the sleeve-member and engaging the larger bore of the body; a gasket-ring and a follower-ring slidably mounted on the sleeve-member and engaging the larger bore of the body; a gasket positioned intermediate the gasket-ring and the follower-ring; means to exert physical pressure on the follower-ring; spacer means positioned between the collar and the gasket-ring, said sleeve-member having apertures adapted to introduce fluid pressure gasket-ring.

4. In a pipe joint comprising a body having a cylindrical portion bored to two diameters, a sleeve member rotatably and longitudinally movable within said body and fitting partly within the smaller bore thereof; a collar positioned on the sleeve-member and engaging the larger bore of the body; a gasket-ring and a follower-ring slidably mounted on the sleeve-member and engaging the larger bore of the body; a gasket positioned intermediate the gasket-ring and the follower-ring; spacer means positioned between the collar and gasket-ring; adjustable means to exert a yielding physical pressure on the follower-ring, and adjustable means to limit the outward longitudinal movement of the sleeve-member within the body.

5. In a pipe joint comprising a body having a cylindrical portion bored to two diameters, a sleeve-member rotatably and longitudinally movable within said body and fitting partly within the smaller bore thereof; a straight collar formed integrally with the sleeve-member and engaging the larger bore of the body; a gasket-ring and a follower-ring slidably mounted on the sleeve-member and having a flat peripheral portion engaging the larger bore of the body, the opposite sides of said gasket-ring and follower-ring being outwardly flared; a gasket of substantially trapeziform cross section fitting in the space intermediate the gasket-ring and follower-ring; means to exert fluid pressure on the gasket-ring; means to exert physical pressure on the follower-ring and means positioned on the body to limit the outward longitudinal movement of the sleeve-member and parts mounted thereon within said body.

In testimony whereof I affix my signature.

ALOYSIUS M. FRAUENHEIM.